(12) United States Patent
Cocchi et al.

(10) Patent No.: US 10,905,134 B2
(45) Date of Patent: Feb. 2, 2021

(54) BASE/ADDITIVE PRODUCT FEEDING UNIT FOR A MACHINE FOR THE PRODUCTION AND/OR DISTRIBUTION OF AN ICE CREAM PRODUCT AND MACHINE COMPRISING SAID UNIT

(71) Applicant: ALI GROUP S.r.l.—CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco sul (IT)

( * ) Notice: Subject to any disclaimer, the term of this patent is extended or adjusted under 35 U.S.C. 154(b) by 273 days.

(21) Appl. No.: 15/983,714

(22) Filed: May 18, 2018

(65) Prior Publication Data
US 2018/0343887 A1    Dec. 6, 2018

(30) Foreign Application Priority Data

Jun. 1, 2017    (IT) .......................... 102017000060614

(51) Int. Cl.
*A23G 9/28*    (2006.01)
*A23G 9/20*    (2006.01)
(Continued)

(52) U.S. Cl.
CPC ................ *A23G 9/28* (2013.01); *A23G 9/08* (2013.01); *A23G 9/12* (2013.01); *A23G 9/20* (2013.01); *A23G 9/22* (2013.01)

(58) Field of Classification Search
CPC ... A23G 9/04; A23G 9/08; A23G 9/12; A23G 9/20; A23G 9/22; A23G 9/28; A23G 9/281
See application file for complete search history.

(56) References Cited

U.S. PATENT DOCUMENTS 3,803,870 A * 4/1974 Conz .................. A23G 9/16
                                                    62/342
7,178,976 B2 * 2/2007 Gerber ................ A23G 9/228
                                                    366/177.1
(Continued)

FOREIGN PATENT DOCUMENTS

WO    WO02082932 A1    10/2002
WO    WO2004075651 A1   9/2004

OTHER PUBLICATIONS

Italian Search Report dated Feb. 16, 2018 from counterpart Italian App No. 201700060614.

*Primary Examiner* — Christopher J Besler
*Assistant Examiner* — Christine Bersabal
(74) *Attorney, Agent, or Firm* — Shuttleworth & Ingersoll, PLC; Timothy J. Klima

(57)    ABSTRACT

A base/additive product feeding unit for a machine for the production and/or distribution of ice cream, or other ice cream product, comprises a plurality of storage tanks for delivering predetermined quantities of base/additive products used to prepare ice cream in a batch freezing chamber provided with a stirrer and heat treatment means. The connection between the storage tanks and the batch freezing chamber is accomplished by an intake having a plurality of side inputs connected to respective storage tanks and an additional input made in a cover of the intake and connected to a further storage tank in such a way as to allow at least two storage tanks to be superposed on each other.

12 Claims, 3 Drawing Sheets

(51) Int. Cl.
*A23G 9/12* (2006.01)
*A23G 9/08* (2006.01)
*A23G 9/22* (2006.01)

(56) References Cited

U.S. PATENT DOCUMENTS

| | | | |
|---|---|---|---|
| 9,127,881 B2* | 9/2015 | Anderson | A23G 9/045 |
| 2004/0191367 A1* | 9/2004 | Dacey | A23G 9/228 |
| | | | 426/103 |
| 2005/0201196 A1 | 9/2005 | Gerber | |
| 2011/0061420 A1 | 3/2011 | Anderson et al. | |

* cited by examiner

BASE/ADDITIVE PRODUCT FEEDING UNIT FOR A MACHINE FOR THE PRODUCTION AND/OR DISTRIBUTION OF AN ICE CREAM PRODUCT AND MACHINE COMPRISING SAID UNIT

This application claims priority to Italian Patent Application 102017000060614 filed Jun. 1, 2017, the entirety of which is incorporated by reference herein.

BACKGROUND OF THE INVENTION

This invention relates to a feeding unit for a machine for distributing single doses of ice cream or other ice cream product. More in detail, this invention relates to a unit for feeding products which are mixed to obtain a dose of ice cream, or other ice cream product; the feeding unit is provided with an intake structured in such a way as to allow using less components and thus occupying less space.

In the ice cream machine sector, machines are known which comprise a plurality of storage tanks for containing base products (usually in powder form but without excluding liquid or semi-liquid products) and which deliver predetermined quantities of respective products to a mixing chamber, where each product is mixed with other products, such as sugar or thickening agents.

Once the base product has been mixed with the additive product, the mixture is fed into a batch freezing chamber where it is cooled and stirred to obtain the end product, that is, ice cream or other ice cream product.

To convey the base products from the tanks to the batch freezing chamber below, there is, in some cases, a collecting hopper into which the base products delivered by the tanks are poured.

To prevent mixing different base products, there are a certain number of ducts running side by side and leading into the mixing chamber, each from a different tank.

The number of tanks in a feeding unit structured in this way is, however, limited and adding a tank increases the overall dimensions of the machine.

On the other hand, reducing the overall dimensions of the machined to obtain a more compact configuration necessarily involves eliminating one or more tanks.

SUMMARY OF THE INVENTION

This invention proposes to optimize space so as to make it possible to add one or more tanks without changing the size of the feeding unit, or to reduce the overall size of the machine without eliminating any tank, that is to say, make the machine more compact, possibly by reducing the number of some of the components.

This disclosure therefore has for an aim to provide a feeding unit for a machine for the production and distribution of single doses of ice cream or other ice cream product, which makes it possible to add one or more tanks without changing the overall size of the machine, or which is more compact than feeding units currently in use with the same number of tanks, allowing the overall size of the machine to be reduced.

Another aim of this disclosure is to provide a feeding unit equipped with an intake which is capable of collecting the products delivered by two or more tanks and mix them together before transferring them to the batch freezing chamber.

Yet another aim of the disclosure is to provide an intake for collecting base products, usually in powder form but without excluding liquid or semi-liquid products, and one or more additive products, such as sugar or thickening agents, and which does not necessitate cleaning and/or maintenance whenever the basic product being fed is changed.

A further aim of the disclosure is to provide an intake for the base products, usually in powder form but without excluding liquid or semi-liquid products, which is easy to disassemble for cleaning or inspection purposes.

According to the invention, these aims are achieved by a feeding unit forming the object of the invention, comprising the technical features described in one or more of the appended claims.

BRIEF DESCRIPTION OF THE DRAWINGS

The technical features of the disclosure, with reference to the above aims, are clearly described in the claims below and its advantages are apparent from the detailed description which follows, with reference to the accompanying drawings which illustrate a preferred, non-limiting example embodiment, and in which:

DESCRIPTION OF THE PREFERRED EMBODIMENTS

With reference to the drawings listed above, the numeral 1 denotes a base and/or additive product feeding unit for a machine for the production and/or distribution of ice cream, or other ice cream product (soft ice cream, sorbets, cool dessert creams) in single doses.

The feeding unit 1 comprises a plurality of storage tanks Sb1, Sb2, Sb3, Sbn, Sba arranged side by side, for containing and delivering predetermined quantities of base products used to prepare ice cream, or other ice cream product, together with additive products and/or water.

The additive products may be sugar, thickening agents or other substances useful or necessary for the preparation of the ice cream or other ice cream product.

Figure 6:
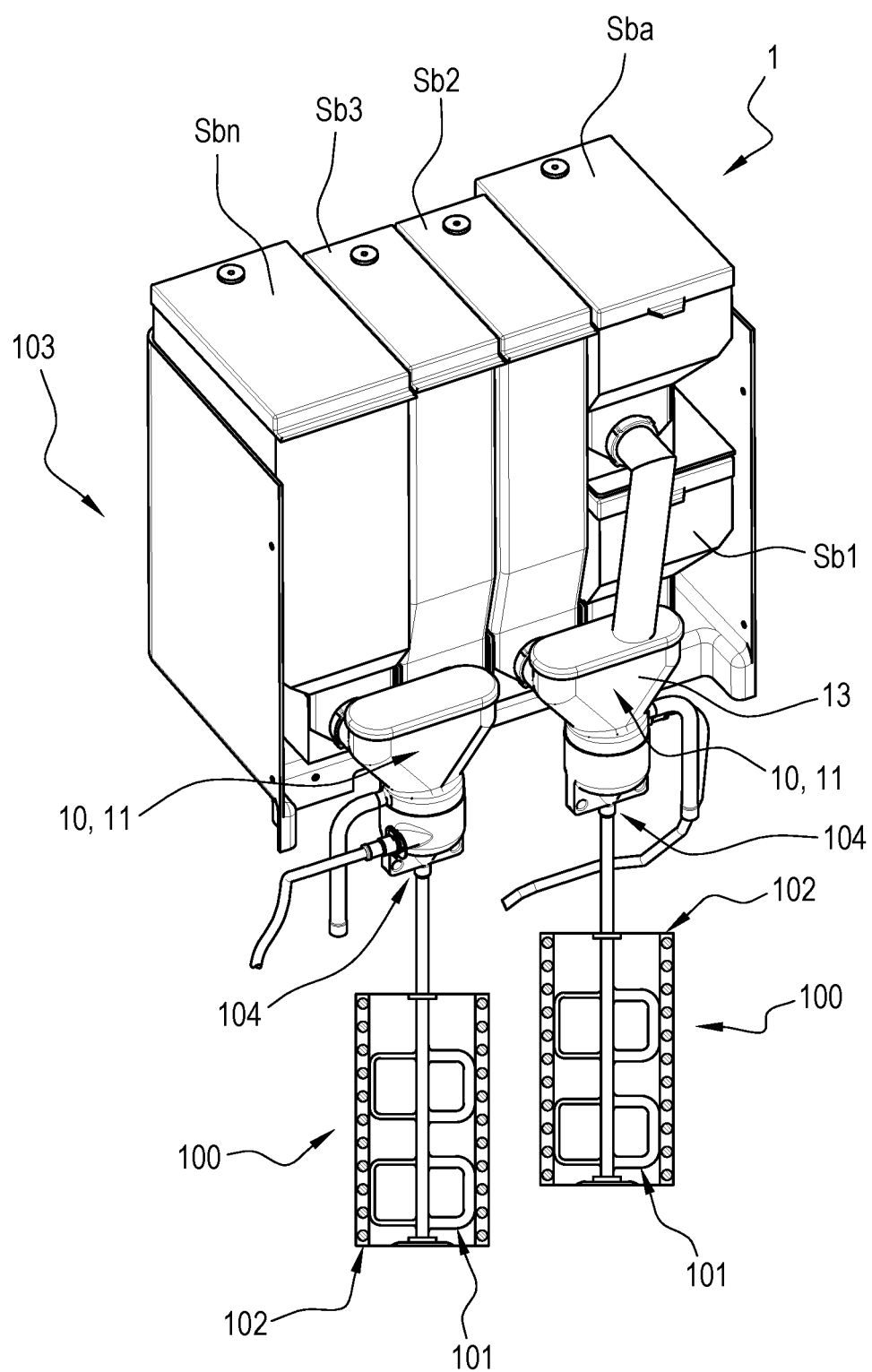
FIG. 6 shows a detail of a machine for the production of ice cream, or other ice cream product comprising the feeding unit illustrated in FIGS. 1-5.

Associated with the set of tanks Sb1, Sb2, SB3, Sbn, Sba, for example below them, there are one or more batch freezing chambers 100 (shown in FIG. 6). Each batch freezing chamber 100 is provided with a stirrer 101 and heat treatment means 102 (usually refrigerating systems) for processing the mixture of products delivered by the tanks Sb1, Sb2, SB3, Sbn, Sba and conveyed into it by collecting means 10.

It should be noted that at least one (Sba) of the tanks (Sb1, Sb2, Sb3, Sbn, Sba) is positioned above another (Sb1) of the tanks (Sb1, Sb2, Sb3, Sbn, Sba).

Each time, in the machine concerned, the base and additive products mixed and processed in the batch freezing chamber 100 produce one dose of ice cream, or other ice cream product (soft ice cream, sorbet, etc.).

The collecting means 10 are constituted by one or more intakes 11, which have two side inputs 12 connected to a related group of storage tanks Sb1, Sb2 from which they receive, each time, predetermined quantities of base/additive product for one dose of ice cream, or other ice cream product.

The collecting means 10 comprise at least one intake 11 having a plurality of side inputs 12 connected to the aforementioned storage tanks Sb1, Sb2 in order to receive said predetermined quantities of base/additive product from the aforesaid storage tanks Sb1, Sb2, and having at least one additional input 13 connected to said one (Sba) of said storage tanks (Sb1, Sb2, Sb3, Sbn, Sba), that is to say, connected to the tank Sba which is situated above another storage tank Sb1.

Obviously, there may be any number of storage tanks Sb1, Sb2, Sb3, Sbn and in this case, purely by way of non-limiting example, it is assumed that there are four storage tanks Sb1, Sb2, Sb3, Sbn.

Figure 5:
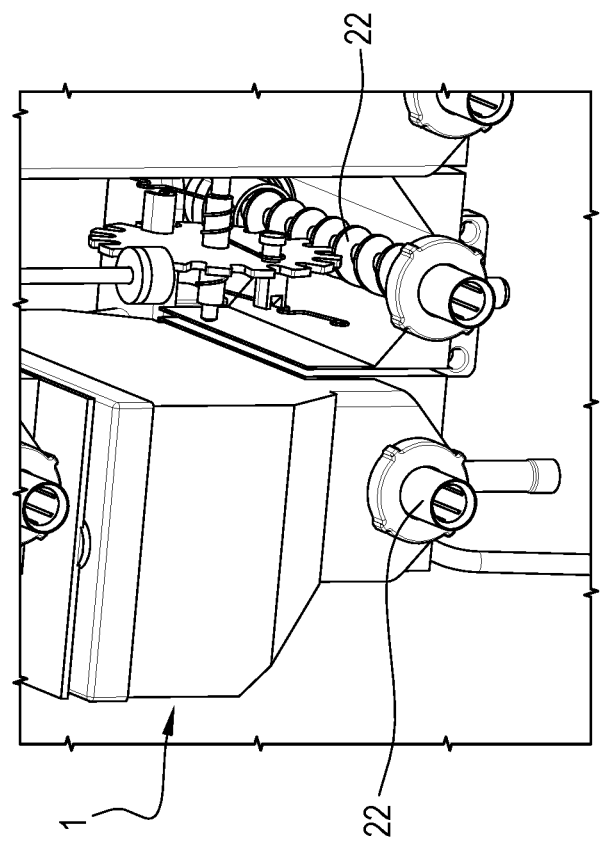
FIG. 5 shows a detail of the feeding unit of FIG. 1, with some parts cut away in order to better illustrate the components inside the tanks.
Figure 3:
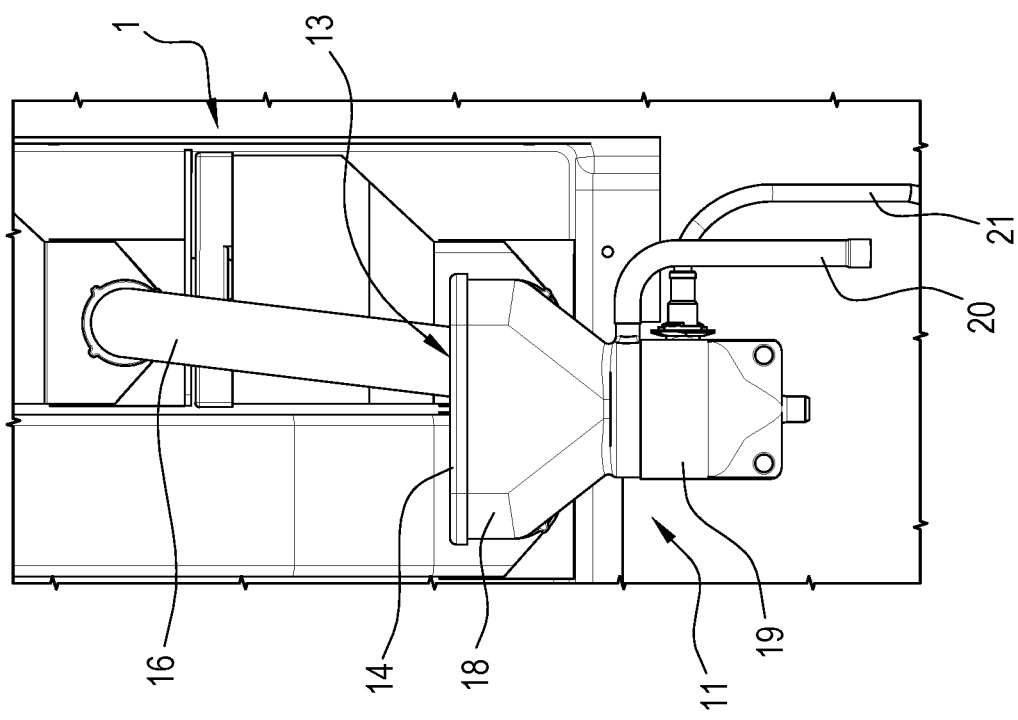
FIG. 3 is a front view of the detail of FIG. 2.

To deliver the predetermined quantities of base/additive products, the storage tanks Sb1, Sb2, Sb3, Sbn, Sba are provided with motorized screw feeders 22 (see FIG. 5). By making control means (not illustrated) rotate the screw feeders 22 a preset number of times, it is possible to define the predetermined quantities of base (additive products to be delivered.

Other parts of the machine 103, such as the load-bearing structure, the circuitry and the control and drive component, are not illustrated or described.

Now assuming that you wish to add a fifth storage tank Sba, for example for an additive product, possibly without changing the overall dimensions of the machine, or that you wish to reduce the size of a machine 103, for example with five tanks, making it more compact and repositioning one of the existing tanks.

According to this aspect, this invention proposes that at least one intake 11 have, in addition to the two side inputs 12 connected to a related group of two respective storage tanks Sb1, Sb2, at least one additional input 13 (situated preferably, but not necessarily, at a position above the side inputs 12).

Figure 4:
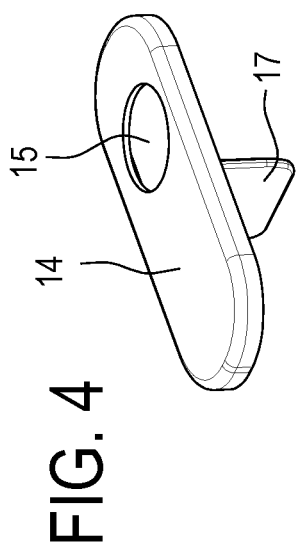
FIG. 4 shows a part of the detail of FIGS. 2 and 3, separated from the detail itself.

More in detail, the intake 11 comprises a cover 14 provided with a hole 15 constituting the additional input 13, as clearly shown in FIG. 4.

The conduit 16, which joins the intake 11 to the tank Sba is connected to the hole 15 in the cover 14 and extends vertically as far as the tank Sba, which contains an additive product, for example.

The vertically extending conduit 16 allows placing the additional tank Sba so it is superposed on one of the other tanks Sb1, Sb2, Sb3, Sbn.

Figure 1:
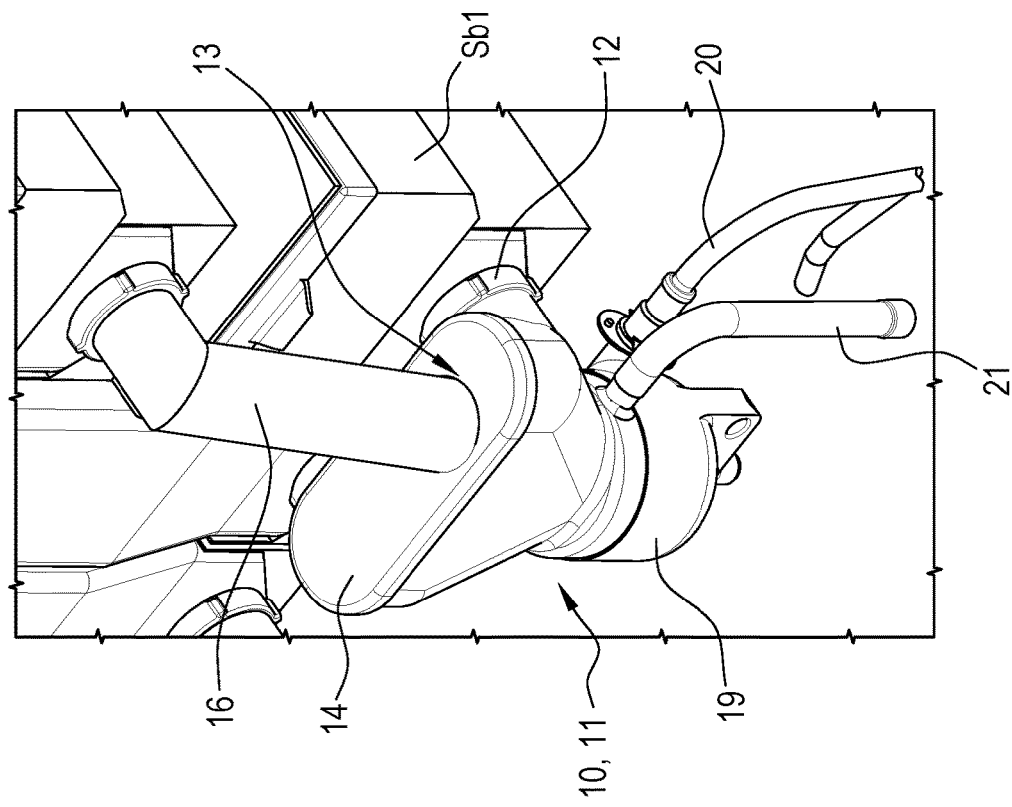
FIG. 1 is a schematic, axonometric view of a feeding unit designed to be associated with a machine for the production of ice cream, or other ice cream product.

That way, the additional tank Sba, which is the fifth tank, can be added without having to increase the overall size of the machine 103, as clearly shown in FIG. 1, by placing it above one of the other tanks, for example the first tank Sb1.

On the other hand, if the machine 103 needs to be compacted, a fifth tank Sba can be moved to a position where it is superposed on one of the other tanks (Sb1, Sb2, Sb3, Sbn), for example the first tank Sb1, thereby reducing the overall size of the machine 103 with a more compact configuration.

In both cases, the two superposed storage tanks Sb1, Sba may have an overall vertical size which is reduced so as not to increase, or not to increase excessively, the vertical size of the machine 103.

In other words, the total vertical size of the two tanks Sb1, Sba, when superposed, is preferably not greater than the vertical size of the other tanks Sb2, Sb3, Sbn.

The (removable) cover 14 of the intake 11 is also provided with a partition 17 extending from the surface of it which is intended to face the inside of the intake 11 itself.

The purpose of the partition 17, shown in FIG. 4, is to separate, at least partly, the channels which are thus formed inside the intake 11, each of which corresponds to one input 12 and one related tank Sb1, Sb2, so as to prevent undesired mixing of two different base products at the top of the intake.

Looking in more detail, the intake 11 comprises a hopper-shaped upper portion 18 and a mixing chamber 19, for example cylindrical, located under the hopper-shaped upper portion 18.

The predetermined quantities of base products and additive product from the hopper-shaped upper portion 18, corresponding to a one dose of ice cream, or other ice cream product, are conveyed into the mixing chamber 19 where they are mixed before being sent on to the batch freezing chamber 100.

To facilitate mixing, and also for cleaning purposes, the mixing chamber 19 is connected to a duct 20 which supplies compressed air and which mixes the powders of the base product with those of the additive product. The compressed air is also used to empty the mixing chamber 19 more effectively and to clean and dry it.

It should be noted that the air supply duct 20 is provided with an on-off valve to allow or prevent the flow of air.

More precisely, the machine 103 comprises a control unit, not illustrated, connected to the valve of the duct 20 in order to open/close the valve.

Also leading into the mixing chamber 19, again for cleaning purposes, there is a duct 21 which carries water into the mixing chamber. The duct 21 also provides water (or other liquid) which may be necessary for preparing the ice cream, or other ice cream product, and which must be added to the mixture of base/additive product powders.

It should be noted that the water supply duct 21 is provided with an on-off valve to allow or prevent the flow of water.

More precisely, the machine 103 comprises a control unit, not illustrated, connected to the valve of the duct 21 in order to open/close the valve.

Figure 2:
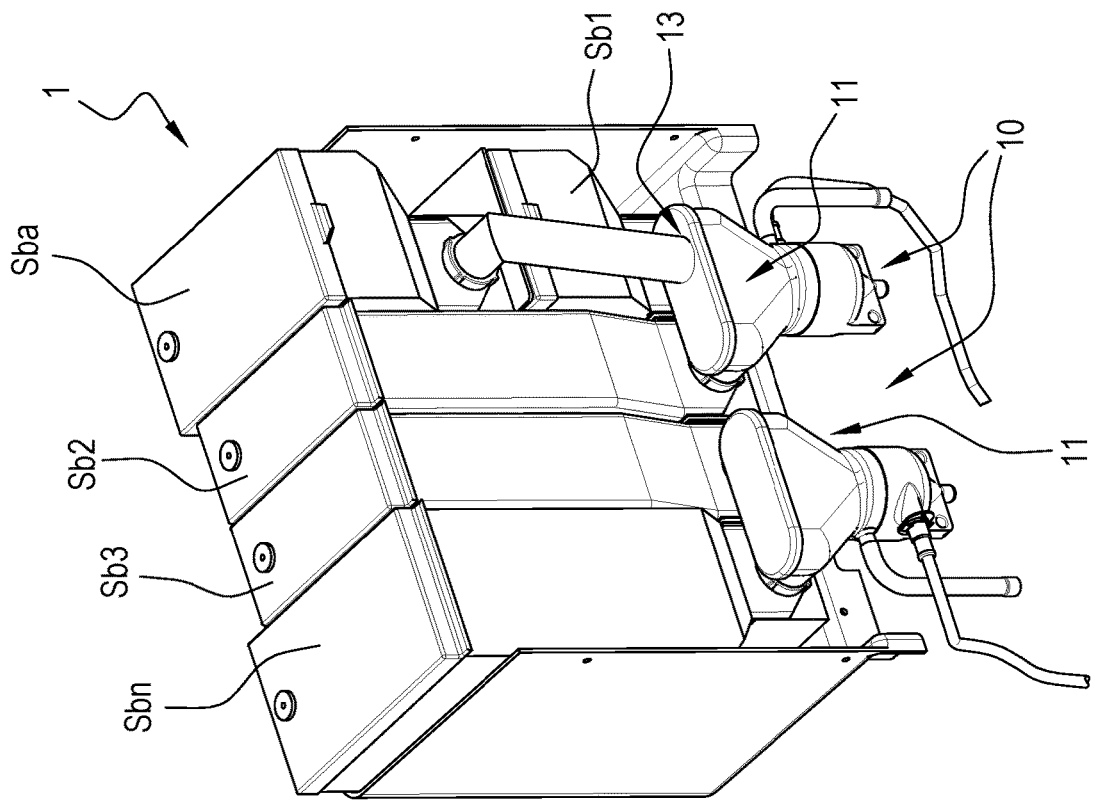
FIG. 2 shows a schematic, axonometric view of a detail of the feeding unit of FIG. 1.

To further reduce overall size, the hopper-shaped upper portion 18 of the intake has a flat funnel shape, as clearly shown in FIG. 2.

In short, a more compact machine 103 is provided for the production and distribution of an ice cream product in single doses and which comprises a feeding unit 1 for feeding base/additive products for preparing ice cream, or other ice cream product, and which in turn comprises a plurality of storage tanks Sb1, Sb2, Sb3, Sbn, Sba placed side by side and/or superposed, adapted to store and deliver predetermined quantities of the base/additive products.

The machine obtained comprises a batch freezing chamber 103, which is provided with a stirrer 101 and heat treatment means 102 and which is operatively connected to the storage tanks Sb1, Sb2, Sb3, Sbn, Sba by related collecting means 10 constituted by an intake 11 with three inputs 12, 13, of which two inputs 12 are located at the side and are connected to tanks Sb1, Sb2, for example containing base products, and a third input 13 which is located on the cover 14 and which is connected to a further storage tank Sba, for example containing additive products.

It should be noted that the heat treatment means 102 preferably comprise a refrigerating system (which uses a heat exchanger fluid according to a thermodynamic cycle, preferably a vapor compression cycle).

Preferably, the refrigeration system comprises a first heat exchanger associated with the batch freezing chamber 100.

The refrigeration system further comprises a second heat exchanger.

The refrigeration system further comprises a compressor.

The refrigeration system further comprises a throttling element.

It is clear that the feeding unit 1 proposed by this invention and applied to the aforementioned machine 103 achieves the aims set out above.

In the machine 103 for distributing single doses of ice cream, or other ice cream product, made as described herein, it is possible to add one or more storage tanks, without changing the overall dimensions of the machine, by simply fitting one or more of the intakes 11 described above.

The number of intakes 11 needed for this purpose remains limited thanks to the presence of two or more inputs on each intake 11.

It is also possible to make a feeding unit 1 which is more compact than the units currently in use, by superposing two or more tanks (Sb1, Sba) in such a way as to reduce the overall size of the machine 103.

The proposed feeding unit 1 is provided with an intake 11 capable of collecting predetermined quantities, corresponding to one dose of ice cream or other ice cream product, of the products delivered by two or more tanks, and mixing them before they are transferred to the batch freezing chamber 100, adding water or other liquids, if necessary, for the preparation of the ice cream, or other ice cream product.

It should be noted that in an alternative embodiment, mixing is performed inside the batch freezing chamber 100.

Since the mixing chamber 19 is supplied with water and air through the corresponding ducts 20 and 21, the intake 11 applied to the feeding unit 1 does not require cleaning and/or maintenance operations (to be performed by an operator) each time the base product is changed.

Moreover, the provision of the removable cover 14 with the hole 15 makes the intake 11 easy to open for cleaning and/or inspection purposes.

It should be noted that the number and arrangement of the storage tanks Sb1, Sb2, Sb3, Sbn, Sba as described and illustrated in the drawings are purely exemplary and not in any way intended to limit the scope of the invention.

What is claimed is:

1. A machine for single-dose production and distribution of an ice-cream product, comprising:
    a base/additive product feeding unit, comprising:
        a plurality of storage tanks containing respective base/additive products, arranged side by side and configured to contain and deliver predetermined quantities of base/additive products the plurality of storage tanks including a first group and a second group;
        a collecting unit for receiving the predetermined quantities of the base/additive products necessary to produce at least one dose of an ice cream product;
        the collecting unit comprising a first intake and a second intake, the first intake having two side inputs respectively connected to two of the storage tanks of the first group to receive the predetermined quantities of base/additive products from the two of the storage tanks of the first group,
        the second group including a further storage tank being situated above one of the two of the storage tanks of the first group,
        the second intake including a removable cover having an opening connected by a conduit to the further storage tank to provide an additional input to the collecting unit from the further storage tank to receive the predetermined quantities of base/additive products from the further storage tank,
    at least one batch freezing chamber, including a stirrer and heat treatment system, operatively connected to the collecting unit for receiving the predetermined quantities of the base/additive products necessary to produce at least one dose of an ice cream product.

2. The machine according to claim 1, further comprising a release element, associated with the collecting unit, that is movable between a closing position and an opening position to permit the release of product contained within the collecting unit.

3. The machine according to claim 2, wherein the release element includes a valve.

4. The machine according to claim 1, further comprising an air duct and a base liquid duct for supplying, respectively, air and base liquid into the intakes.

5. The machine according to claim 4, comprising a first valve for closing the air duct and a second valve for closing the base liquid duct.

6. The machine according to claim 1, and further comprising a plurality of motorized augers connected to the plurality of storage tanks, respectively for delivering the predetermined quantities of base/additive products.

7. The machine according to claim 1, wherein the cover includes a partition extending into the second intake.

8. The machine according to claim 4, wherein the collecting unit further includes a hopper-shaped upper portion and a mixing chamber located under the hopper-shaped upper portion.

9. The machine according to claim 4, wherein the air duct and the base liquid duct connect into the mixing chamber.

10. The machine unit according to claim 8, wherein the hopper-shaped upper portion has a flattened funnel shape.

11. The machine unit according to claim 1, wherein the further storage tank and the one of the two of the storage tanks of the first group each have a height that is shorter than a height of another of the plurality of storage tanks of the first group.

12. The machine unit according to claim 1, wherein the further storage tank and the one of the two of the storage tanks of the first group each have a height, such that when combined, the combined height is equal to a height of another of the plurality of storage tanks of the first group.

* * * * *